Nov. 4, 1969

H. F. BIENERT 3,476,841

PROCESS FOR PRODUCING A FOAMED POLYSTYRENE
PRODUCT HAVING A HARD SKIN

Filed Sept. 6, 1966

INVENTOR.
HERBERT F. BIENERT

BY Westell & Hanley

United States Patent Office 3,476,841
Patented Nov. 4, 1969

3,476,841
PROCESS FOR PRODUCING A FOAMED POLY-
STYRENE PRODUCT HAVING A HARD SKIN
Herbert F. Bienert, 7 Balmoral St., Bramalea,
Ontario, Canada
Filed Sept. 6, 1966, Ser. No. 577,182
Claims priority, application Great Britain, Sept. 9, 1965,
38,641/65
Int. Cl. B29c 5/00
U.S. Cl. 264—45       13 Claims

ABSTRACT OF THE DISCLOSURE

A method of producing a foamed polystyrene product having a hard skin, using prefoamed polystyrene pellets, in which a solvent of polystyrene, which is volatile at the activating temperature of the polystyrene pellets, is introduced onto the inner surface of a mould. The mould, filled with the pellets, is then heated to activate the pellets and melt those adjacent the mould walls, after which the mould is cooled.

The present invention relates to the production of articles having a rigid structure of foamed plastic material and more particularly to the production of a foamed polystyrene product having a hard outer surface or skin.

The production of foamed plastic articles is well known and their use is extensive since the products are light, the material provides good insulation, and the cost is low. Typical products made of foamed plastic are insulation boards, packing materials, and spacing materials.

However, there is a disadvantage in the use of foamed plastic as a structural material because the low density of the foamed plastic makes it easily subject to damage by pressure or fluid impregnation. Also, deposits such as dust easily collect on the surface of such products and are difficult to remove because of its relative unevenness. Consequently the use of foamed plastic is restricted to products which do not have to withstand any considerable amount of impact or other pressure on their surfaces, or do not require a surface which can easily be cleaned. To overcome this problem it would be advantageous to provide a foamed plastic product having an outer surface or skin which would be considerably stronger than the remainder of the material and/or have a smooth surface. Methods have been disclosed to obtain such an outer surface or skin on structural foamed plastic members but such processes are either too complicated and/or expensive, do not lend themselves to quality, depth or area control of the formed skin, or are adaptable only to the production of small articles of simple shape.

It is an object of the present invention to provide a relatively simple and inexpensive method of producing a foamed polystyrene product having an outer surface which is resistant to compressive forces and fluid impregnation and is abrasive resistant.

Another object of the invention is to provide a method of producing a foamed polystyrene product having a hard outer surface, in which method the thickness of the surface is externally controllable and variable over different areas of the product.

Another object of the invention is to provide a method of producing a foamed polystyrene product having a hard outer surface which is reinforced by embedded material.

Figure 1:
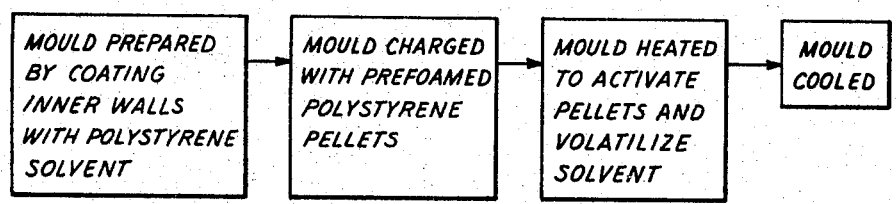
FIGURE 1 is a flow diagram of one method of carrying out the invention.
Figure 2:
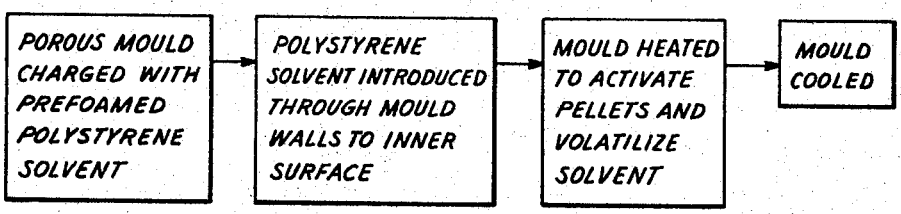
FIGURE 2 is a flow diagram of an alternate method of carrying out the invention.
Figure 3:
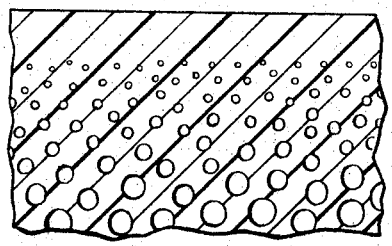
FIGURE 3 is a fragmentary cross-sectional view of a product produced in accordance with the invention.

In carrying out the invention a mould is used which has a cavity conforming in shape and configuration to that of the article desired to be produced. The mould may be made of any suitable material which will transfer externally applied heat into the cavity, such as steel or aluminum. The thickness of the walls of the mould will, together with other factors, determine the skin thickness. The mould may be sectional to open for charging or may have a closable orifice enabling the charge to be blown into the cavity. The closed mould should be made resistant to internal pressures but should not be airtight to enable the blowing gas of the polystyrene, and other gases such as steam generated within the cavity, to escape. The walls of the mould should have an inner surface of a texture which it is desired should appear on the finished product (modified by any material embedded in the material forming the hard outer surface, hereinafter for convenience called the "skin"); in other words the articles produced in the mould by the method of the invention will have a skin of a texture mirroring that of the walls of the mould cavity. To produce a glazed surface, therefore, the inner surface of the mould walls should be polished.

In producing an article according to the method of the invention, the inner surface of the mould walls are preferably coated, by spraying or other means, with a releasing agent such as a silicone mould release liquid. The mould is then charged with prefoamed expandable polystyrene pellets. Polystyrene beads suitable for the purpose are sold commercially by such companies as Badishe Anilin & Soda Fabrik A.G. of Ludwigshafen, Germany, under the trademark "Styropor," by Koppers Company Inc., of Pittsburgh, Pa., U.S.A., under the trademark "Dylite," and by Dow Chemical of Canada, limited under the trademark "Pelaspan." The expandable polystyrene beads originally have a density usually of approximately 32 pounds per cubic foot and these are pre-expanded or prefoamed to approximately 2 to 20 pounds per cubic foot to form pellets.

The prefoamed pellets of polystyrene are charged into the mould to fill the cavity therein. As mentioned before, the mould may be sectional in which case one section forming a lid could be removed to expose the cavity for charging and then bolted down after the cavity has been filled. The prefoamed pellets lend themselves to being transferred by blowing and, as mentioned before, the mould may be thus filled through on orifice which would then be plugged. It should be pointed out that by prefoaming the polystyrene all parts of the mould cavity will be filled; this is important to obtain a product of uniform quality since if the mould were to be charged with unexpanded beads of polystyrene it would be necessary to either rotate the mould during expansion of the beads in order to transfer them to all parts of the cavity in order to prevent an uneven hard surface and core developing at the original position of rest of the beads in the mould when heat is applied externally to the mould to expand the beads and form the skin. Also, prefoaming results in a product having a lower core density. If desired the prefoamed pellets may be moistened with water, for instance by sprinking, before charging them into the mould, two per cent by weight of water being a convenient amount.

After the mould cavity has been filled with prefoamed polystyrene pellets it is closed and clamped or otherwise secured against internal pressures but, as mentioned before, is not airtight. The mould is then heated externally, for instance by placing it in a hot air furnace or a hot liquid bath, a bath being preferred for better circulation and transfer of heat. The first purpose of the heat transfer is to activate and further expand the prefoamed polystyrene pellets to form a unitary foamed product and the temperature required to effect this purpose is at least 190 degrees F. The second purpose of the heating is to form the hard outer surface on the expanded polystyrene and to effect this purpose a temperature of at least 240 degrees F. is required which is the melting point of polystyrene. These two purposes can be accomplished either by a single application of heat at a higher temperature or a two step application of heat, one at a lower temperature and a second at a higher temperature.

In the single step application of heat, a temperature of at least 240 degrees F. is applied externally to the mould, the degree of heat being governed by the thickness of skin desired on the product, and depending on the heat transferability of the mould walls and the length of time the heat is applied to the mould. As discussed below, the temperature of the applied heat may be lowered if a solvent is used on the walls of the mould cavity since the heat will activate the driving gas of the pellets while the solvent will liquefy them at their area of contact with the inner surfaces of the mould walls. For a thicker skin and/or a shorter time period for heating a higher temperature may be applied to the mould. The medium in which the mould is heated will also affect the above mentioned parameters; a gaseous bath will require a longer heating time than a circulating liquid bath of the same temperature. It should be noted, of course, that too high a temperature and heat transfer into the mould will cause a collapse of the core and skin because of too much melting and not enough back-up pressure of the driving gas or blowing agent. The two step operation of heating, i.e. first applying heat at a lower temperature for expanding the polystyrene and then applying heat at a higher temperature for forming the skin, gives faster production and a higher finish to the skin of the product. In the first step the mould is heated, preferably in a water bath, at a temperature in the range of about 190 degrees to 220 degrees F. until the prefoamed polystyrene within the mould has expanded to a limited extent, i.e. the driving force of the blowing agent in the pellets is well under way. The mould is then heated further to a temperature exceeding the melting point of the polystyrene, i.e. at least 240 degrees F. (unless a solvent is used, as discussed below, in which case the temperature of the applied heat may be lowered or the second step eliminated). The heat in the second step is preferably applied by immersing the mould in a salt bath such as one prepared from a granular product sold commercially by E. F. Houghton & Company of Canada Limited under the trademark "Draw Temp" which has a melting point of 275 degrees F. Again, the temperature of the salt bath and the length of time the mould is immersed in the bath depends upon the depth or thickness of skin desired in the product, bearing in mind that too great a heat transfer into the mould cavity will collapse the product. When the heating step or steps have been completed the mould is cooled, preferably immediately, for example by immersion in a cool water bath. It has been found that adequate cooling is achieved by immersion for ten minutes in a water bath having a temperature of 60 degrees F., where the thickness of the product is not more than two inches. On completion of the cooling period the mould is opened and the finished product is removed. When removed from the mould the product can be handled normally but achieves its full strength and hardness only after exposure to air for a period of twenty-four hours.

An alternate method of accelerating the formation of the skin on the polystyrene expanded in the mould is to coat the interior walls of the mould with a polystyrene solvent, usually prior to charging it (or immersing a porous mould, filled with prefoamed polystyrene, in a bath of the solvent). Examples of such solvents are naphtha and trichlorethylene. A commercial naphtha suitable for the purpose is sold under the trademark "Hi-Flash" by the Steel Company of Canada Limited of Hamilton, Ontario, Canada. A trichlorethylene suitable for the purpose is sold by Canadian Hanson and Van Winkel Company Limited under the trademark "Royalene DX." The solvent dissolves the polystyrene in contact with the interior walls of the mould but vapourizes and is driven off during the heating step (or steps). The amount of solvent applied to the mould walls controls the amount of polystyrene which is dissolved and therefore controls the skin thickness.

The method of the present invention, especially (but not necessarily) where a solvent coating is used as described above, allows for the production of a skin reinforced or decorated with suitable additional materials, for example cloth or sand (crystallized silicon dioxides). The reinforcing material is applied to the inner walls of the mould in the area where it is desired to reinforce the product. The mould is then filled and the product produced in the manner of the invention described above. Conveniently, cloth may be impregnated with polystyrene solvent or a coating of the solvent on the inner walls of the mould may be used as a vehicle to hold discrete particles of reinforcing material such as sand, fibres or chips which may be applied to the inner walls of the mould by spraying or other means onto or in conjunction with the solvent. In the finished product having a hardened outer surface reinforced in this manner, the reinforcing material is embedded in the skin, or may be bonded to the skin. Cloth reinforcing gives a scored appearance to the skin depending upon the gauge of the cloth, the finish of the skin surface and the degree to which it is embedded to the skin. Sand or other small particulate reinforcing material is not particularly noticeable in the product. It should be noted that asbestos cloth or fibres or other known products can be used in this manner to obtain increased flame retardancy for the product.

In carrying out the process of the invention using a water or air bath, water seeps into the moulds because of the fact that the mould is not air tight. The water thus entering the mould activates the driving gas or blowing agent and helps to expand the prefoamed polystyrene pellets by distributing the heat throughout the mould cavity. The same passages allowing seepage of water into the cavity also allow air to escape as the polystyrene further expands and finally allows the driving gas expanding the polystyrene to escape, thus providing a homogeneous product without cavities.

The degree and duration of the heat applied externally to the charged mould will affect the density of the core of the product in addition to the thickness of the skin. The core density will also be governed by the degree of prefoaming of the polystyrene pellets filling the mould cavity, noting that aging of the prefoamed pellets prior to their use will deplete the driving gas or blowing agent within them. Of course, the size of the mould will also affect the core density since for a given temperature a mould of larger dimensions will require more time for the heat to penetrate to the centre of the cavity and activate the pellets in that area. Also, in a mould of larger dimensions there is more polystyrene to contribute to forming the skin relative to the inner surface area of the mould and therefore the resulting product will have a higher core density than a smaller product produced under the same conditions. The formation of the hardened outer surface or skin also acts as insulation against the transfer of heat towards the centre of the mould cavity and the external temperature applied to the mould must be adjusted to compensate for both these factors. Actually the formation of the skin allows a higher external temperature to be applied to the mould without causing a collapse of the core of the article by overheating and melting of the pellets in the core.

Where the time taken for carrying out the method of the invention is important, as in mass production, the heating step (or steps) may be accelerated by preheating the mould before charging it with the prefoamed polystyrene.

The following examples are illustrative of the scope of the invention but are not intended as a limitation thereon:

EXAMPLE 1

In this example a cylindrical steel mould of 1/8" wall thickness was used having an internal diameter of 12" and a length of 16". The mould was filled with "Styropor" polystyrene prefoamed to a density of 6 pounds per cubic foot and was then closed and clamped to resist internal pressures, the closures being not an airtight fit.

The mould was first immersed in a non-circulating water bath at a temperature of 210 degrees F. for a period of 5 minutes. The mould was then immediately transferred and immersed in a non-circulating air bath (furnace) at 450 degrees F. for 15 minutes. The mould was then immediately transferred and immersed in a water bath of 60 degrees F. for 10 minutes to cool.

The resulting product was found to have a skin thickness of 3/16" a skin density of 32 pounds per cubic foot, and a core density of 4.3 pounds per cubic foot.

EXAMPLE 2

In the example, a rectangular aluminum mould was used having a wall thickness of 1/4" with the internal dimensions of the mould cavity being 2" x 8" x 13". Each wall comprised a separate sectional plate and the walls were bolted together externally, i.e. the bolts passed through the two opposing face plates and the plates of 2" width bore against them.

The mould was filled with prefoamed "Styropor" polystrene having a density of 6.5 pounds per cubic foot and was closed and bolted. The mould was placed in a water bath at 210 degrees F. for five minutes and then transferred to a salt bath at 300 degrees F. for four minutes. Finally, the mould was transfered to a cooling water bath at 60 degrees F. for ten minutes.

The resulting product had a skin thickness of 1/32", a skin density of 32 pounds per cubic foot and a core density of 3.5 pounds per cub foot.

EXAMPLE 3

A rectangular aluminum externally bolted sectional mould 1/4" was used (as in Example 2) with a wall thickness of 1/4" and dimensions 1½" x 12" x 12".

The mould was filled with moistened "Styropor" polystyrene prefoamed to a density of 8 pounds per cubic foot and was closed and bolted. The mould was placed in a non-circulating air bath at 500 degrees F. for 17 minutes and then transferred to a cooling water bath at 60 degrees F. for 10 minutes.

The resulting product had a skin thickness of 1/16", a skin density of 32 pounds per cubic foot and a core density of 3.5 pounds per cubic foot.

EXAMPLE 4

A rectangular aluminum externally bolted sectional mould was used having a wall thickness of 1/4" and dimensions 2" x 13" x 13". The internal walls of the mould were coated by spraying them with a layer of "Hi-Flash" naphtha and the mould was then filled with "Styropor" polystyrene prefoamed to 7.5 pounds per cubic foot. The filed mould was then closed and bolted.

The mould was placed in a non-circulating water bath at 210 degrees F. for ten minutes and then transferred to a cooling bath at 60 degrees F. for ten minutes.

The resulting product had a skin thickness of 1/32", a skin density of 32 pounds per cubic foot and a core density of 5.5 pounds per cubic foot.

EXAMPLE 5

The mould of Example 4 was used.
One internal wall surface 13" x 13" of the mould was faced with 150 denier cloth and moistened with 'Royalene DX" trichloroethylene. The mould was then filled with "Styropor" polystyrene prefoamed to 7.5 pounds per cubic foot, closed and bolted.

The mould was placed in a water bath at 210 degrees F. for 10 minutes and then cooled in a water bath at 60 degrees F. for 10 minutes.

The resulting product had a skin thickness of 1/32" (including the cloth), a skin density of 32 pounds per cubic foot and a core density of 5.5 pounds per cubic foot. The cloth was embedded below the skin surface and therefore air sealed.

EXAMPLE 6

The mould of Example 4 was used.
One internal wall surface 13" x 12" of the mould was faced with 350 denier cloth and moistened with "Hi-Flash" naphtha. The mould was then filled with "Styropor" polystyrene prefoamed to 10 pounds per cubic foot and the mould was closed and bolted.

The mould was placed in a water bath at 210 degrees F. for 10 mintues and then cooled in a water bath at 60 degrees F. for 10 minutes.

The resulting product had a skin thickness of 1/8" (including the cloth), a skin density of 32 pounds per cubic foot and a core density of 3.5 pounds per cubic foot. The cloth was embedded below the surface of the skin.

EXAMPLE 7

A rectangular aluminum externally bolted sectional mould was used having a wall thickness of 1/4" and internal wall dimensions of 3" x 15" x 16".

The internal wall surfaces of the mould were sprayed with "Hi-Flash" naphtha. The mould was then filled with "No. 60 Pelastan" polystyrene (No. 2 size bead) prefoamed in water to 6.5 pounds per cubic foot and the mould was then closed and bolted.

The mould was immersed in a water bath at 210 degrees F. for 5 minutes and then in a salt bath at 325 degrees F. for 1.5 minutes and finally in a cooling water bath at 60 degrees F. for 10 minutes. The resulting product had a skin thickness of 1/32", a skin density of 32 pounds per cubic foot and a core density of 2.8 pounds per cubic foot. The outer surface of the skin was characterized by a high glaze.

It is observed that when a small mould of aluminum is used, the mould first sinks in the water bath as air bubbles escape and then rises in the bath as the driving gas is generated and escapes (also driving out the water in the mould cavity). Where a salt bath is used in a second step of the process the moisture remaining in the mould cavity from the water bath will generate steam because of the higher temperature and this steam will escape through the same passages in the mould walls causing bubbles to appear in the salt bath. Such bubbles will also indicate the expulsion of further driving gas from the mould cavity as the polystyrene expands to its controlled density limit.

It will be appreciated that a mould of any suitable shape may be used to carry out the method of the invention provided that the walls of the mould are of the proper thickness to transfer heat to achieve the desired skin thickness. Varying the thickness of the mould walls over different areas will result in a corresponding variation in the thickness of the skin, which result may also be achieved by varying over different areas the temperature of the heat applied externally to the mould walls or the duration of application of the heat. It should be noted, however, that when using a solvent on the inner surface of the mould walls and heating the mould at a lower temperature solely in a water bath (i.e. a single step) the thickness of the mould walls will not govern the skin thickness because the transferred heat will activate the driving gas while the solvent will form the skin.

I claim:
1. A method of producing a foamed polystyrene product having a hard outer surface, comprising the steps of: (1)(a) introducing onto the inner surface of a closable, heat conducting, non-airtight mould a solvent for polystyrene, said solvent being volatile at the activating temperature of prefoamed expandable polystyrene pellets, the solvent being introduced onto areas of the mould inner surface corresponding to areas of the product where a hardened surface is desired, and (b) filling the mould with said pellets; then (2) heating the walls of the mould externally to a temperature and for a time sufficient (a) to activate and expand said pellets, (b) to melt sufficient of said pellets adjacent the inner surface of the mould to form a skin of desired thickness, and (c) to drive the volatilized solvent from the mould; and then (3) cooling the mould.

2. A method as claimed in claim 1 in which the walls of the mould are heated by immersion of the mould in a hot air bath.

3. A method as claimed in claim 1 in which the solvent is naphtha.

4. A method as claimed in claim 1 in which the solvent is trichlorethylene.

5. A method as claimed in claim 1 in which material for reinforcing the surface of the polystyrene product is applied to at least a portion of the inner surface of the mould.

6. A method as claimed in claim 5 in which the reinforcing material is fire retardant.

7. A method as claimed in claim 5 in which the reinforcing material is a woven fabric.

8. A method as claimed in claim 5 in which the reinforcing material is particulate.

9. A method as claimed in claim 1 in which the amount of solvent introduced onto different areas of the mould inner surface is varied to vary the thickness of the hardened outer surface of the polystyrene product accordingly.

10. A method as claimed in claim 1 in which the solvent is coated on the inner surface of the mould.

11. A method as claimed in claim 1 in which a pourous mould is employed and the solvent is introduced onto the inner surface of the mould through the mould after the mould has been filled with the polystyrene pellets.

12. A method as claimed in claim 1 in which the walls of the mould are heated by immersion of the mould in a water bath having a temperature of 210° F.

13. A method as claimed in claim 12 in which the mould is cooled by quenching immediately upon completion of said heating step in a water bath having a temperature of 60° F.

References Cited

UNITED STATES PATENTS

| | | | |
|---|---|---|---|
| 1,659,962 | 2/1928 | Schaeffer. | |
| 2,787,809 | 4/1957 | Stastny | 264—53 |
| 2,898,632 | 8/1959 | Irwin | 264—48 |
| 2,908,943 | 10/1959 | Miller | 264—46 |
| 2,926,389 | 3/1960 | Garlington | 264—48 XR |
| 3,243,484 | 3/1966 | Immel | 264—48 |

OTHER REFERENCES

"Styrofoam, Technical Data," Dow Chemical Co., copyright symbol 1947, p. 13.

Stastny, Fritz: "Molds and Fixtures for Styropor Fabrication," p. 15 (translation of "Forman und Vorrichtungen sur Verarbeitungen Von Styropr," reprint from Der Plastverarbeiter 5, No. 9, 12 pp.).

PHILIP E. ANDERSON, Primary Examiner

U.S. Cl. X.R.

18—5; 264—48, 51, 338, 341